US008228021B2

(12) United States Patent
Cheung et al.

(10) Patent No.: US 8,228,021 B2
(45) Date of Patent: Jul. 24, 2012

(54) CONVERTER CIRCUIT

(75) Inventors: Ka Wai Eric Cheung, Hong Kong SAR (CN); Xiangdang Xue, Hong Kong SAR (CN)

(73) Assignee: Automotive Parts and Accessory Systems R & D Centre Limited, Kowloon (HK)

( * ) Notice: Subject to any disclaimer, the term of this patent is extended or adjusted under 35 U.S.C. 154(b) by 425 days.

(21) Appl. No.: 12/508,693

(22) Filed: Jul. 24, 2009

(65) Prior Publication Data

US 2011/0018480 A1    Jan. 27, 2011

(51) Int. Cl.
*H02P 27/04* (2006.01)
(52) U.S. Cl. ........................................ 318/800; 318/803
(58) Field of Classification Search .................. 318/599, 318/811, 798, 800, 803, 806
See application file for complete search history.

(56) References Cited

U.S. PATENT DOCUMENTS

| 4,500,824 | A | * | 2/1985 | Miller | 318/701 |
| 4,739,240 | A | * | 4/1988 | MacMinn et al. | 318/696 |
| 5,959,438 | A | * | 9/1999 | Jovanovic et al. | 323/222 |
| 7,372,232 | B2 | * | 5/2008 | Ramu | 318/700 |

* cited by examiner

*Primary Examiner* — Rina Duda
(74) *Attorney, Agent, or Firm* — Leydig, Voit & Mayer, Ltd.

(57) ABSTRACT

A converter circuit includes a phase circuit having a switch module, a first winding, a first diode, a second winding, and a second diode. The second winding is inductively coupled to the first winding. A multi-phase motor including the converter circuit, and a related method of controlling such a motor, are also provided.

16 Claims, 11 Drawing Sheets

CONVERTER CIRCUIT

FIELD OF THE INVENTION

The present invention relates to converter circuits, particularly, but not exclusively, those used in switched reluctance motors.

BACKGROUND OF THE INVENTION

Switched reluctance motors (SRMs) have a wide variety of applications. Low-power versions are used in washers and dryers. Medium-power variants are found in applications such as industrial general-purpose drives and train air-conditioning drives. Fans, pumps and wind power generation are some of the applications for high-power SRMs. High-speed versions of SRMs are used in applications such as centrifuges for medical applications and aircraft jet engine starter motor generators. SRMs are also used in linear drive applications including low-speed direct propulsion drive transit systems.

One prior converter for controlling SRMs is an asymmetric half-bridge converter. A typical asymmetric half-bridge converter circuit is shown in FIG. 1 and comprises two discrete switching components and two diodes per phase. The phase winding is connected in series between the switching components. The unconnected ends of the switching components are connectable to a respective pole of a power supply. One end of each diode is connectable in reverse bias to a respective pole of the power supply. The other end of each diode is connected between the phase winding and the switching component connectable to the other pole of the power supply.

The asymmetric half-bridge converter can be operated in three modes: a charging mode, a freewheeling mode, and a discharging mode. In the charging mode, both switching components are closed, thereby allowing the power supply to charge the phase winding. In the freewheeling mode, one switching component is open and the other is closed, the current thereby circulating, or freewheeling, through the closed switching component and diode connected in parallel to the closed switching component. In the discharging mode, both switching components are open, the current thereby discharging from the phase winding through both diodes back to the power supply and recharging the power supply.

A disadvantage of the asymmetric half-bridge converter, however, is the high number of switching components required, that is, two discrete switching components per phase. This increases the cost of the converter. This also makes the circuitry more complex and increases the number of components that need to be handled during manufacturing. This increases manufacturing labour and time, which in turn, further increases cost.

One variation of the asymmetric half-bridge converter circuit described above utilizes readily available switch modules, with each discrete switching component in the circuit replaced by a respective switch module. That is to say, two switch modules are required per phase. Each switch module is a pre-manufactured integrated unit, itself including two switching components interconnected in series, with each switching component comprising a transistor and a diode connected in reverse bias in parallel across the transistor. Thus, when used in the asymmetric half-bridge converter circuit described above, one switching component in each switch module is redundant.

Although this variation utilizes readily available switch modules, possibly saving manufacturing time, the use of these switch modules results in large sized, heavier, and more costly converters.

It is an object of the present invention to overcome or ameliorate at least one of the disadvantages of the prior art, or to provide a useful alternative.

SUMMARY OF THE INVENTION

The present invention provides in a first aspect a converter circuit including:

a positive terminal connectable to the positive pole of a power supply, and a negative terminal connectable to the negative pole of the power supply; and a phase circuit including:

a switch module having two switch components, one side of one of the switch components forming a first connection, one side of the other of the switch components forming a second connection, and the other sides of the switch components interconnected to form an intermediate connection;

a first winding connected between the first connection and one of the positive and negative terminals, and the second connection connected to the other of the positive and negative terminals;

a first diode connected in reverse bias between the intermediate connection and the terminal to which the first winding is connected;

a second winding connected between the intermediate connection and the terminal to which the second connection is connected; and a second diode connected in reverse bias in series to the second winding and connected between the intermediate connection and the terminal to which the second connection is connected;

wherein the second winding is inductively coupled to the first winding.

Preferably, the phase circuit, when connected to the power supply, is operable in:

a charging mode in which both the switch components are closed, thereby allowing current to flow from the power supply to charge the first winding, and thereby inductively charging the second winding;

a freewheeling mode in which one of the switch components is closed and the other of the switch components is open, thereby allowing current to freewheel through the second winding, the closed switch component, and the second diode; and a discharging mode in which both the switch components are open, thereby allowing current to discharge from the second winding back through the positive terminal.

Preferably, the switch module is an integrated pre-manufactured unit. Each switch component preferably includes a transistor. Preferably, each switch component includes a switch component diode connected in reverse bias in parallel across the transistor. The switch module can be an IGBT module or a GTO module.

Preferably, the first and second windings form a bifilar winding.

In one embodiment, the first winding is connected between the first connection and the positive terminal. In another embodiment, the first winding is connected between the first connection and the negative terminal.

In a further embodiment, the phase circuit includes a plurality of the second windings, each connected in parallel to the other second windings and connected between the intermediate connection and the terminal to which the second connection is connected, and each being inductively coupled to the first winding. Preferably, the phase circuit includes a plurality of the second diodes, each corresponding to a respective one of the second windings, and each connected in reverse bias in series to the respective second winding and connected between the intermediate connection and the terminal to which the second connection is connected. Also preferably, the phase circuit includes a plurality of the first diodes, each corresponding to a respective one of the second windings, and each connected in parallel to the other first diodes and connected in reverse bias between the intermediate connection and the terminal to which the first winding is connected.

Preferably, the converter circuit includes a capacitor connected between the positive and negative terminals and in parallel to the phase circuit.

Preferably, the converter circuit includes a plurality of the phase circuits. Each phase circuit preferably corresponds to a respective phase of a multi-phase power supply. Preferably, each phase circuit corresponds to a respective phase of a multi-phase motor.

The present invention also provides in a second aspect a multi-phase motor including a converter circuit as described above.

The present invention further provides in a third aspect a method of controlling a multi-phase motor including:
providing a converter circuit as described above; and
controlling the multi-phase motor with the converter circuit.

Preferably, the step of controlling the multi-phase motor includes operating each phase circuit sequentially.

Preferably, the operation of each phase circuit includes closing both the switch components, thereby allowing current to flow from the power supply to charge the first winding, and thereby inductively charging the second winding.

Preferably, the operation of each phase circuit includes closing one of the switch components and opening the other of the switch components, thereby allowing current to freewheel through the second winding, the closed switch component, and the second diode.

Also preferably, the operation each phase circuit includes opening both the switch components, thereby allowing current to discharge from the second winding back through the positive terminal.

Furthermore, the step of controlling the multi-phase motor preferably includes using one of the following control modes: current hysteresis control, single-pulse voltage control, and voltage PWM control.

BRIEF DESCRIPTION OF THE FIGURES

Preferred embodiments in accordance with the best mode of the present invention will now be described, by way of example only, with reference to the accompanying figures, in which.

Figure 9:
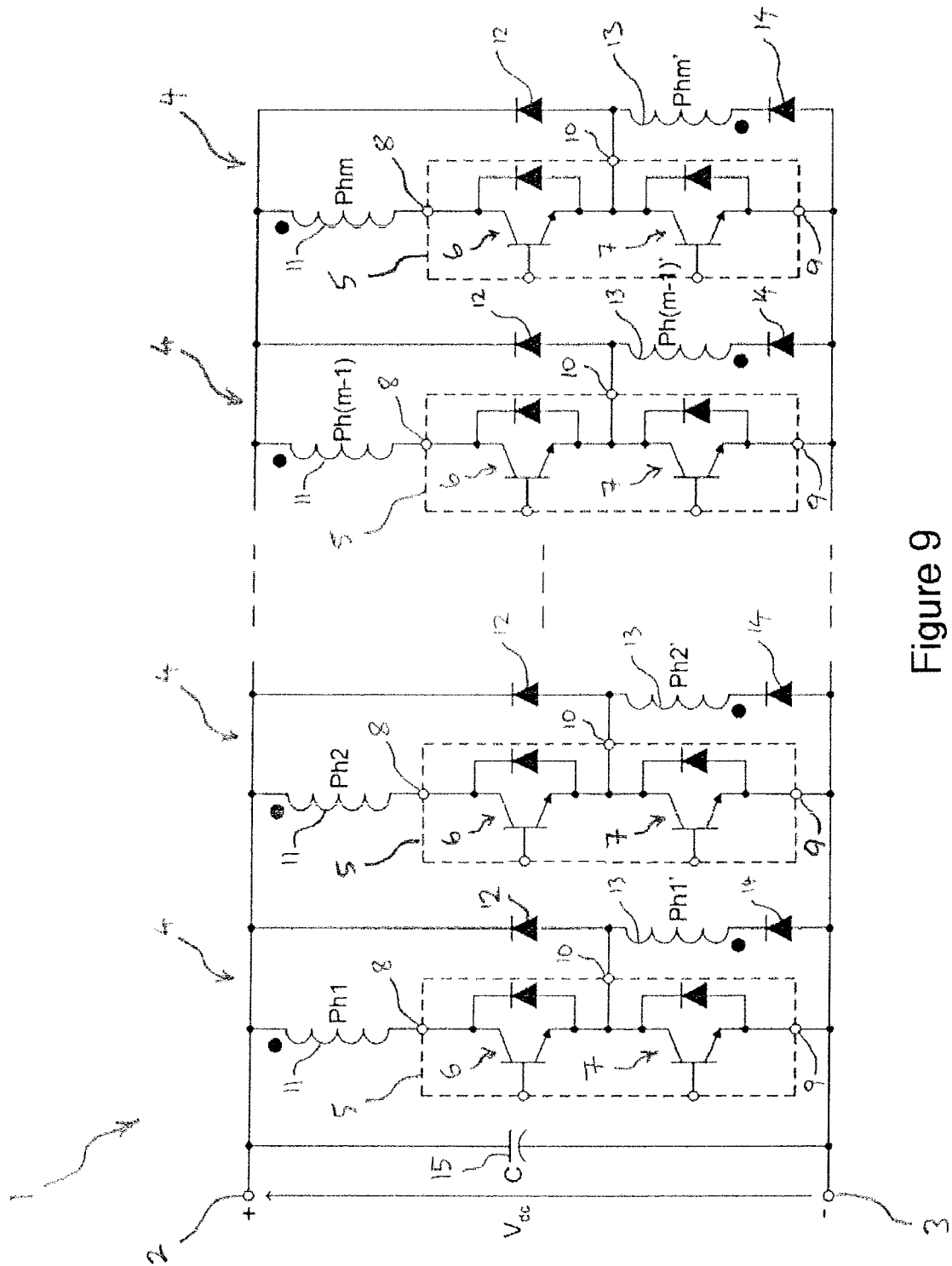
Figure 10:
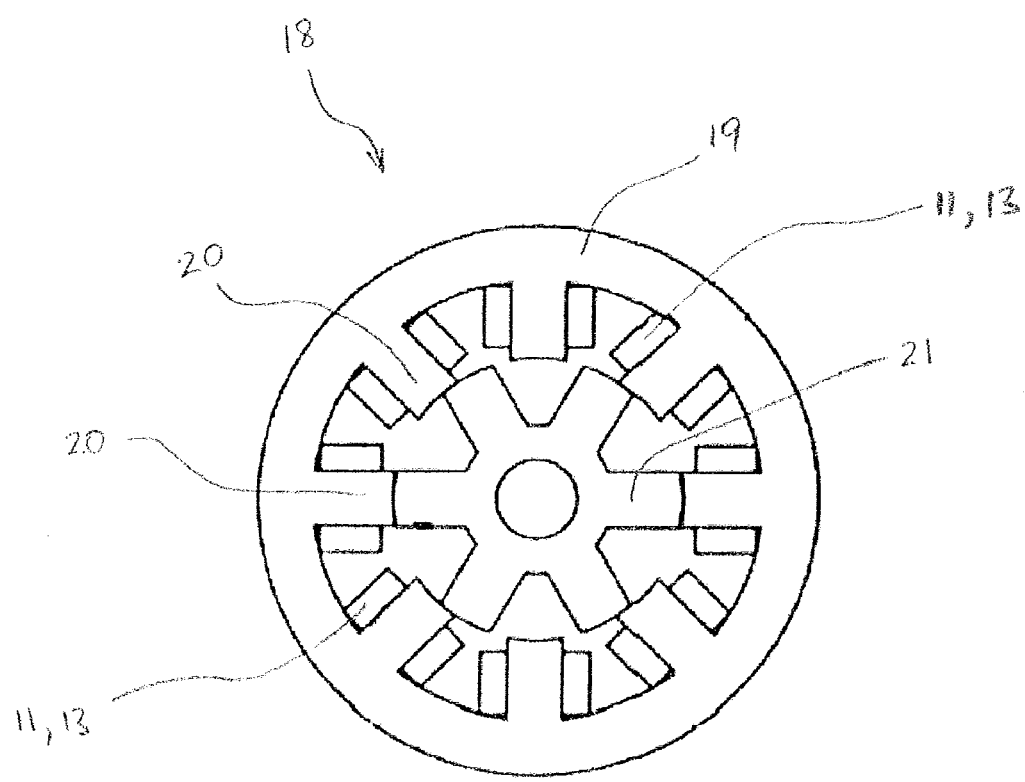
Figure 11:
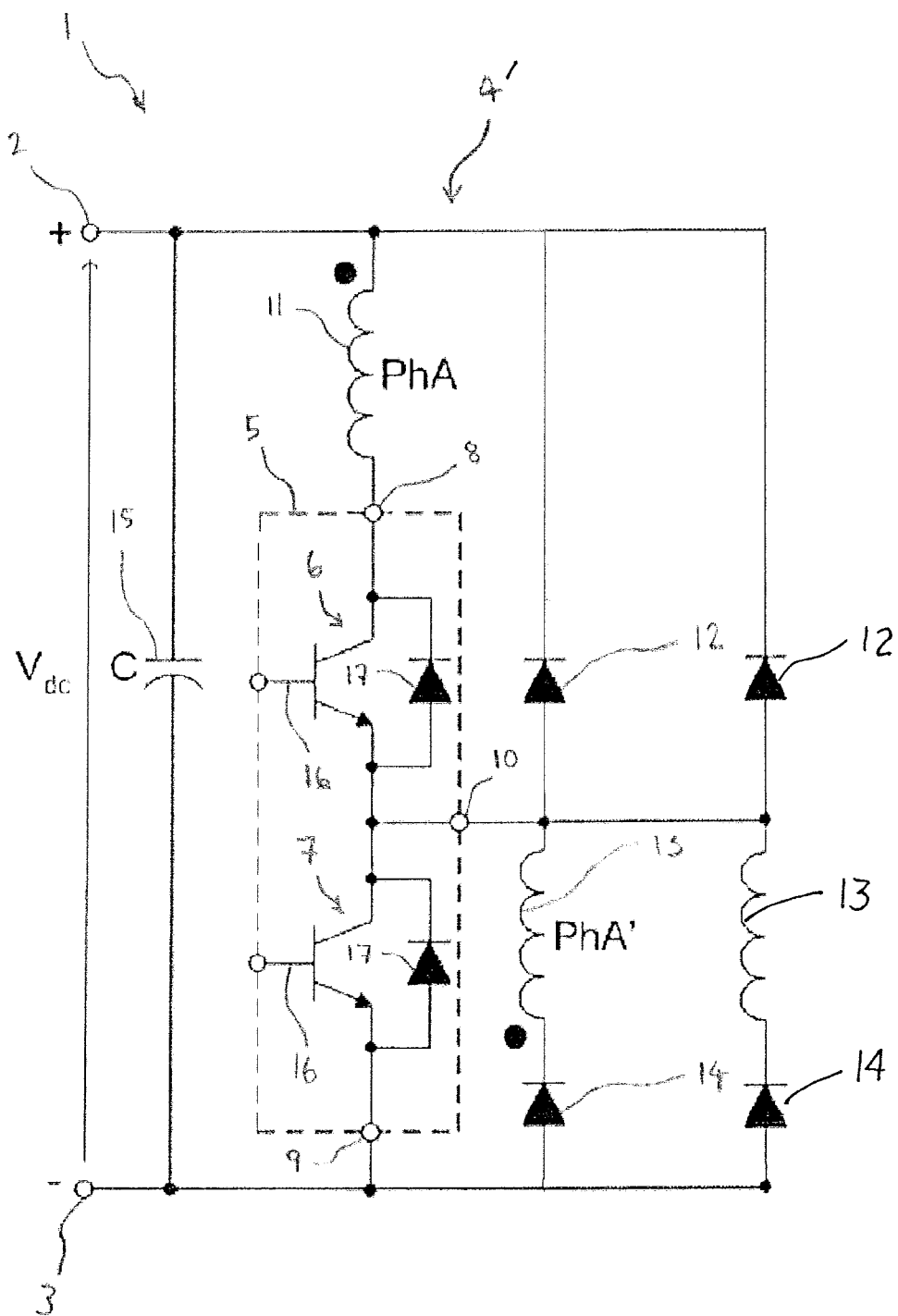

Each series of graphs in FIGS. 6(a)-6(f), 7(a)-7(e), and 8(a)-8(e) shows ideal inductance (L), the reference current ($I_{ref}$), the current ($i_{a1}$) in a first winding (PhA), the current ($i_{a2}$) in a second winding (PhA'), the conduction of a first switch component ($S_{a1}$), the conduction of a second switch component ($S_{a2}$), the current hysteresis band (Δi), the value of the reference current (Ip), and the rotor position (θ);

FIG. 9 is a circuit diagram of a multi-phase converter circuit in accordance with another preferred embodiment of the present invention;

FIG. 10 is a schematic diagram of the stator, rotor, and coils of a four-phase switched reluctance motor controlled by a four-phase converter circuit, both the motor and converter circuit being in accordance with further embodiments of the present invention; and FIG. 11 is a circuit diagram of a converter circuit in accordance with a second preferred embodiment of the invention.

DETAILED DESCRIPTION OF THE BEST MODE OF THE INVENTION

Referring to the figures, a converter circuit 1 includes a positive terminal 2 connectable to the positive pole of a power supply, and a negative terminal 3 connectable to the negative pole of the power supply. The converter circuit 1 further includes a phase circuit 4 that, in turn, includes a switch module 5 having two switch components 6 and 7. One side of one of the switch components 6 forms a first connection 8, one side of the other of the switch components 7 forms a second connection 9, and the other sides of the switch components 6 and 7 interconnect to form an intermediate connection 10. A first winding 11 is connected between the first connection 8 and one of the positive and negative terminals 2 and 3. The second connection 9 is connected to the other of the positive and negative terminals 2 and 3.

Figure 1C:
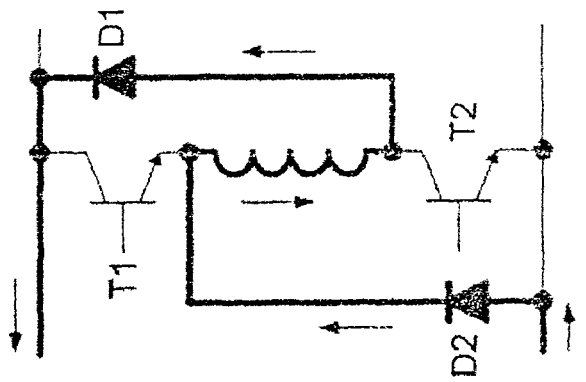
FIGS. 1(a), 1(b), and 1(c) are circuit diagrams of a prior art asymmetric half-bridge converter circuit, showing the current path in bold during charging, freewheeling, and discharging modes respectively.
Figure 1B:
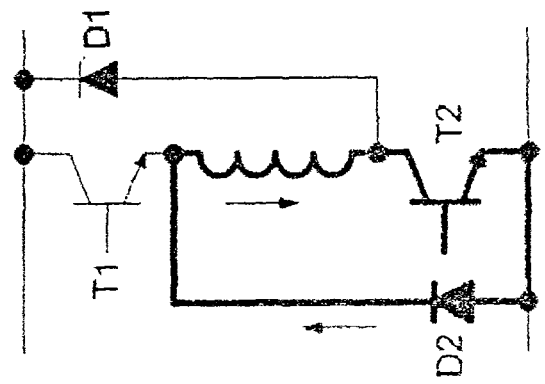
Figure 1A:
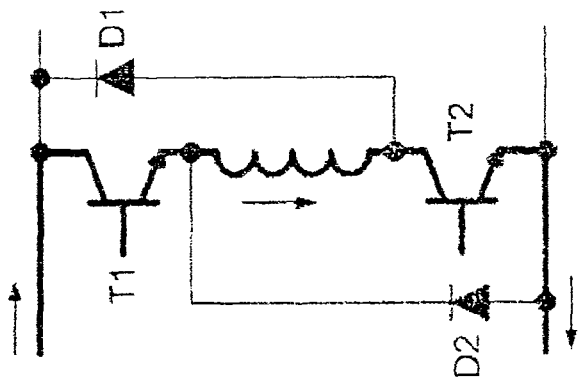
Figure 2:
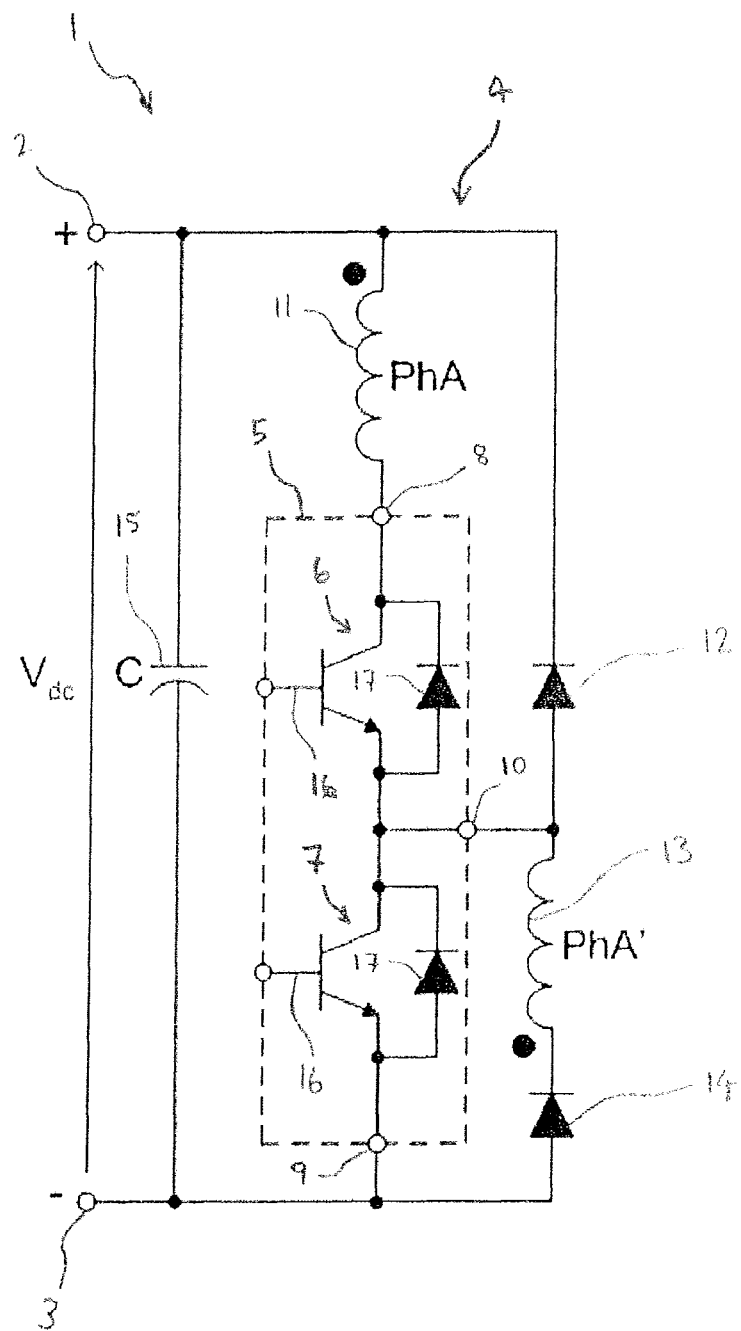
FIG. 2 is a circuit diagram of a converter circuit in accordance with a preferred embodiment of the present invention.

In the present embodiment, as shown in the figures, switch component 6 is the upper switch component and is labeled as the first switch component "$S_{a1}$". Switch component 7 is the lower switch component and is labeled as the second switch component "$S_{a2}$". The first connection 8 is the top connection, being at the top of the switch module 5, as shown in FIG. 2. The first winding 11 is connected between the first connection 8, that is, the top connection, and the positive terminal 2. Thus, the second connection 9 is connected to the negative terminal 3.

In another embodiment (not shown), the positions of the switch components 6 and 7 are reversed. In other words, switch component 6 is the lower switch component and the first connection 8 is the bottom connection, being at the bottom of the switch module 5, as shown in FIG. 2. The first winding 11 is connected between the first connection 8, that is, the bottom connection, and the negative terminal 3. Thus, the second connection 9 is connected to the positive terminal 2.

In all embodiments, a first diode 12 is connected in reverse bias between the intermediate connection 10 and the terminal 2 or 3 to which the first winding 11 is connected. Thus, the first diode 12 is connected in parallel across switch component 6 and the first winding 11. A second winding 13 is connected between the intermediate connection 10 and the terminal 2 or 3 to which the second connection 9 is connected. A second diode 14 is connected in reverse bias in series with the second winding 13 and connected between the intermediate connection 10 and the terminal 2 or 3 to which the second connection 9 is connected. Thus, the serially connected second winding 13 and second diode 14 are connected in parallel across switch component 7.

In the embodiment shown in FIG. 2, the first diode 12 is connected between the intermediate connection 10 and the positive terminal 2, since the first winding 11 is connected to the positive terminal. The second winding 13 is connected between the intermediate connection 10 and the negative terminal 3, since the second connection 9 is connected to the negative terminal. The anode of the second diode 14 is connected to the negative terminal 3, whilst the cathode is connected to one end of the second winding 13. The other end of the second winding 13 is connected to the intermediate connection 10. Thus, the second diode 14 is connected in series to the second winding 13, and the second diode 14 is also connected between the intermediate connection 10 and the terminal to which the second connection 9 is connected, that is, the negative terminal 3.

The second winding 13 is inductively coupled to the first winding 11. Preferably, the first and second windings 11 and 13 form a bifilar winding. The windings can have an air core or be wound around a magnetic core, such as a ferromagnetic rod or silicone steel lamination. In one embodiment, a single winding is supplied. Tappings are then made at different points along the winding to electrically separate the winding into the first and second windings 11 and 13. In another embodiment, the first and second windings 11 and 13 are two separate windings that are wound so that each turn of one is adjacent a respective turn of the other, forming, for example, a double helix. In a further embodiment, two separate windings are wound onto discrete portions of a magnetic core.

Figure 3:
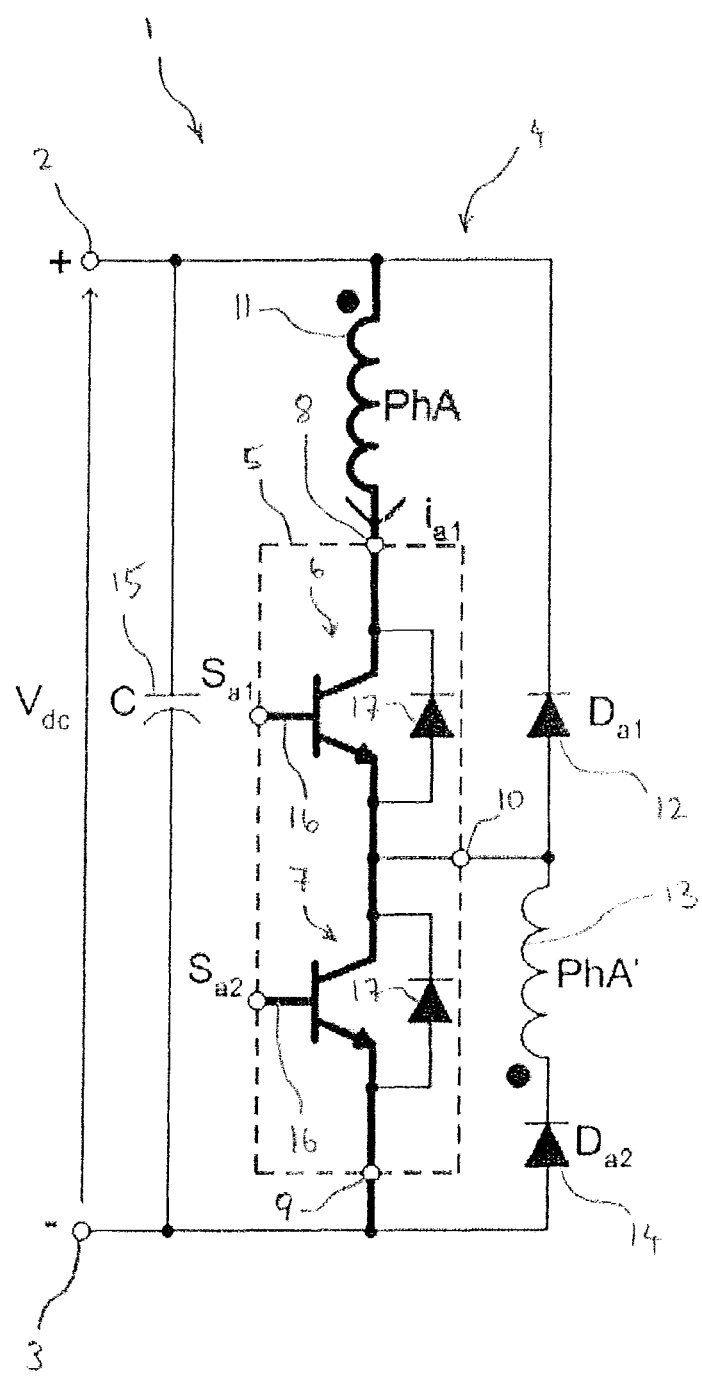
FIG. 3 is a circuit diagram of the converter circuit of FIG. 2 showing the current path in bold during a charging mode, in which both switch components are closed.

The phase circuit 4, when connected to the power supply, is operable in: a charging mode, a freewheeling mode, and a discharging mode. In the charging mode, as best shown in FIG. 3, both the switch components 6 and 7 are closed, thereby allowing current to flow from the power supply to charge the first winding 11. Since the first and second windings 11 and 13 are inductively coupled, the first winding is able to inductively charge the second winding 13.

Figure 4:
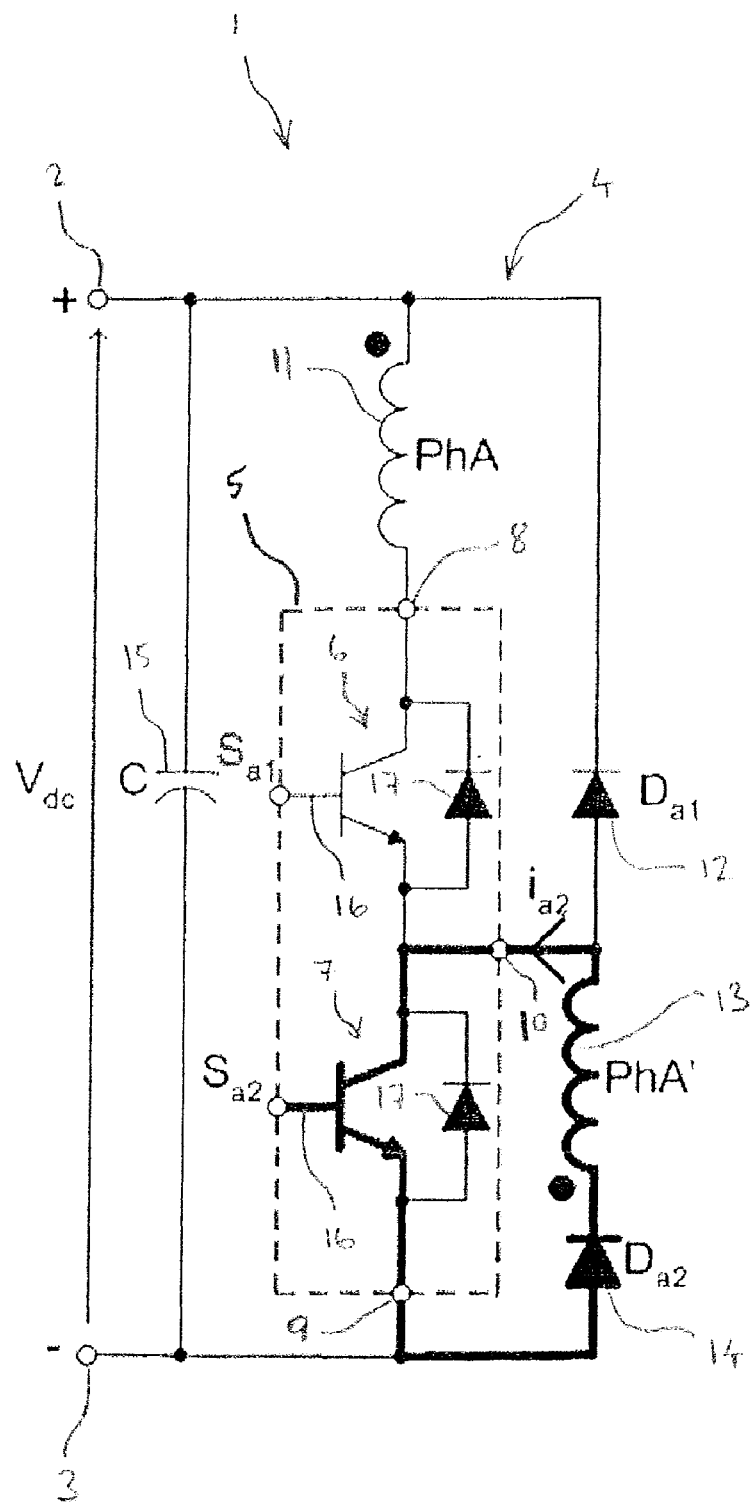
FIG. 4 is a circuit diagram of the converter circuit of FIG. 2 showing the current path in bold during a freewheeling mode, in which one switch component is open and the other is closed.

In the freewheeling mode, as best shown in FIG. 4, one of the switch components 7 is closed and the other of the switch components 6 is open. This allows current to freewheel through the second winding 13, the closed switch component 7, and the second diode 14. In this freewheeling mode, there is no energy transfer between the phase circuit 4 and the power source. The energy stored in the first winding 11 is released through the second winding 13, resulting in the gradual and controlled release of stored energy.

Figure 5:
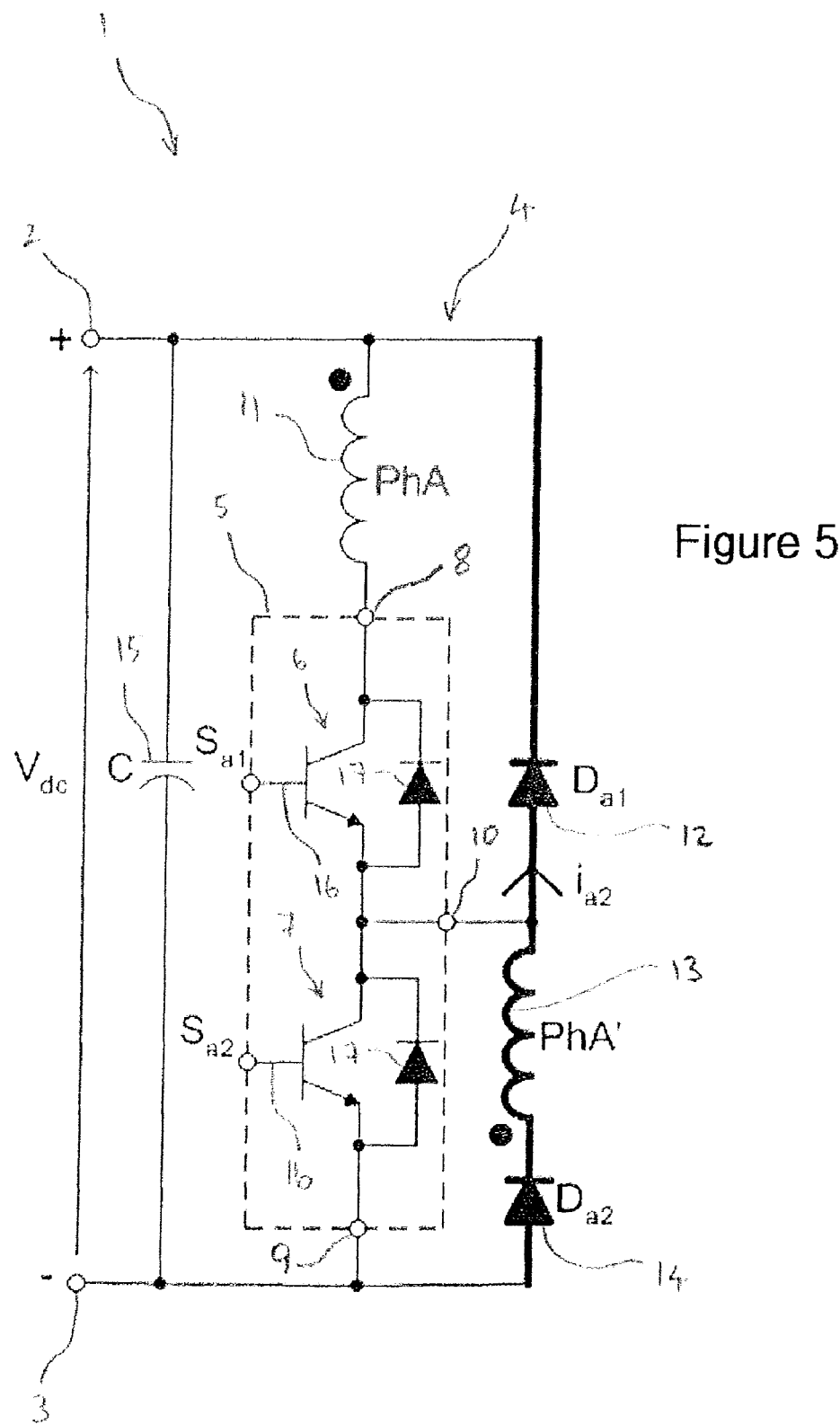
FIG. 5 is a circuit diagram of the converter circuit of FIG. 2 showing the current path in bold during a discharging mode, in which both switch component are open.
Figures 6A, 6B, 6C, 6D, 6E, 6F:
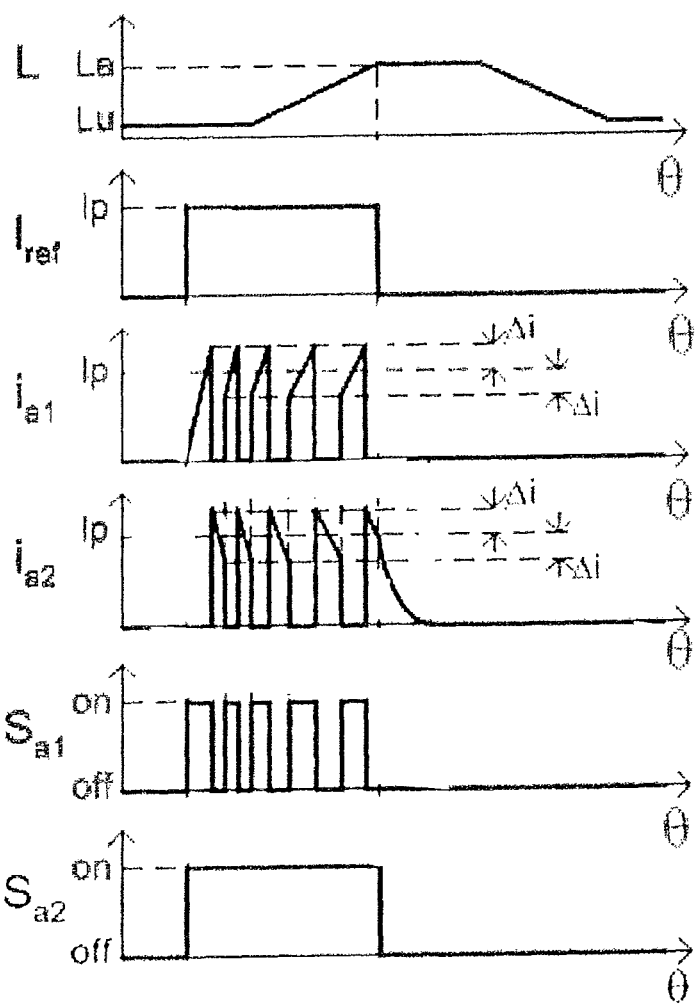
FIG. 6(a) shows the ideal inductance in the converter circuit of FIG. 2, as a function of rotor position, θ, under current hysteresis control.
FIG. 6(b) shows the reference current in the converter circuit of FIG. 2, as a function of rotor position, θ, under current hysteresis control.
FIG. 6(c) shows the current in a first winding of the converter circuit of FIG. 2, as a function of rotor position, θ, under current hysteresis control.
FIG. 6(d) shows the current in a second winding of the converter circuit of FIG. 2, as a function of rotor position, θ, under current hysteresis control.
FIG. 6(e) shows the conduction of a first switch component of the converter circuit of FIG. 2, as a function of rotor position, θ, under current hysteresis control.
FIG. 6(f) shows the conduction of a second switch component of the converter circuit of FIG. 2, as a function of rotor position, θ, under current hysteresis control.
Figures 7A, 7B, 7C, 7D, 7E:
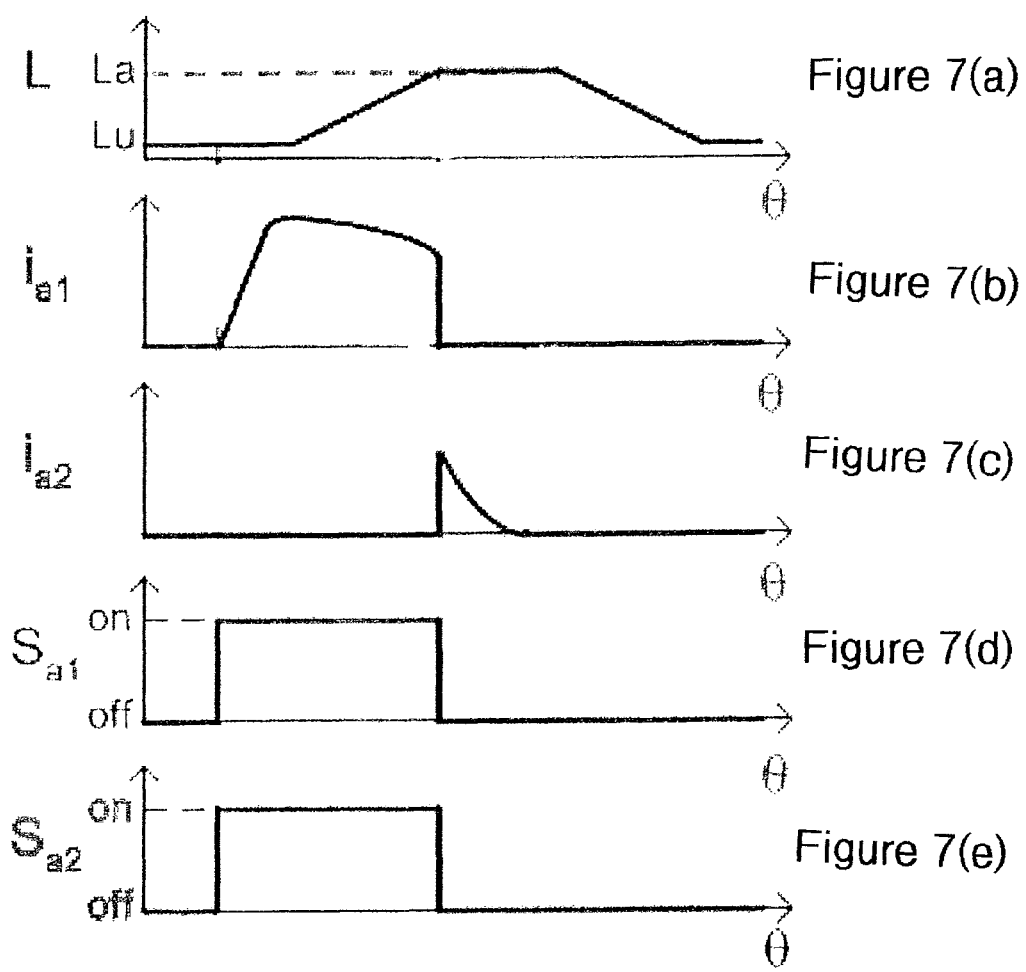
FIG. 7(a) shows the ideal inductance in the converter circuit of FIG. 2, as a function of rotor position, θ, under single-pulse control.
FIG. 7(b) shows the current in a first winding of the converter circuit of FIG. 2, as a function of rotor position, θ, under single-pulse control.
FIG. 7(c) shows the current in a second winding of the converter circuit of FIG. 2, as a function of rotor position, θ, under single-pulse control.
FIG. 7(d) shows the conduction of a first switch component of the converter circuit of FIG. 2, as a function of rotor position, θ, under single-pulse control.
FIG. 7(e) shows the conduction of a second switch component of the converter circuit of FIG. 2, as a function of rotor position, θ, under single-pulse control.
Figures 8A, 8B, 8C, 8D, 8E:
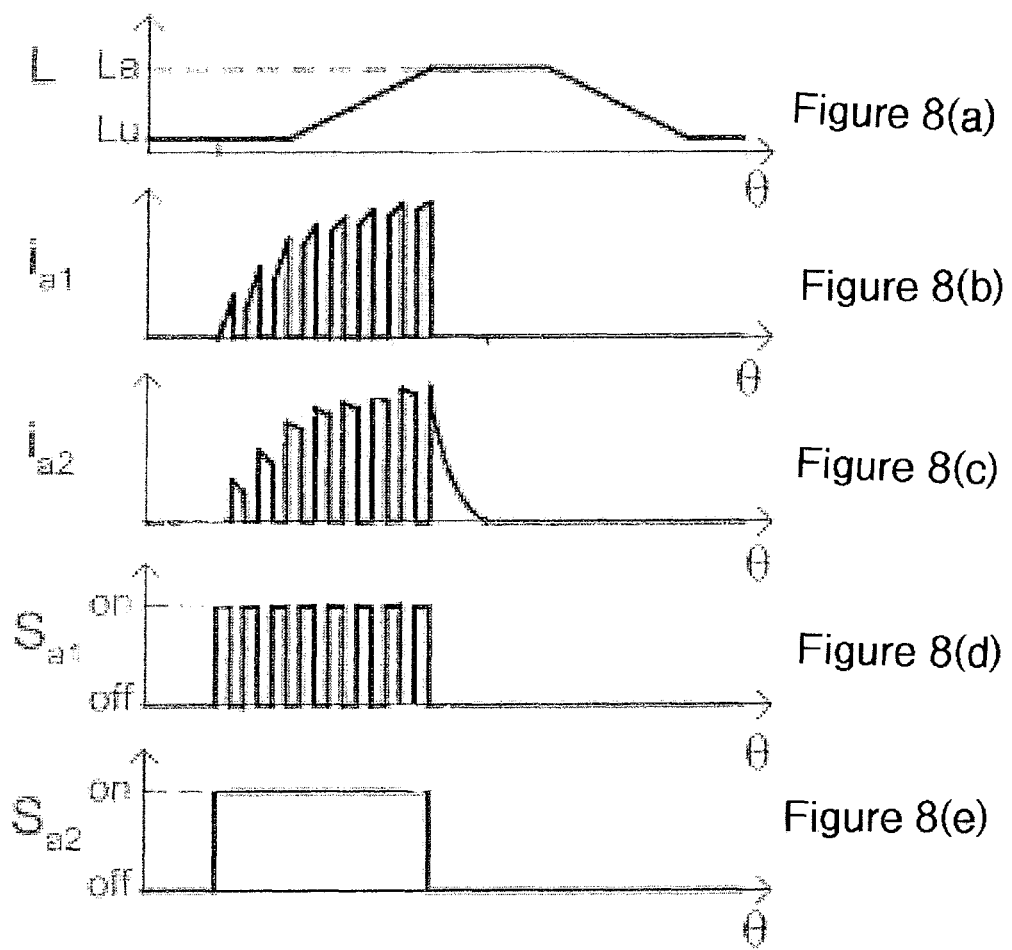
FIG. 8(a) shows the ideal inductance in the converter circuit of FIG. 2, as a function of rotor position, θ, under voltage PWM control.
FIG. 8(b) shows the current in a first winding of the converter circuit of FIG. 2, as a function of rotor position, θ, under voltage PWM control.
FIG. 8(c) shows the current in a second winding of the converter circuit of FIG. 2, as a function of rotor position, θ, under voltage PWM control.
FIG. 8(d) shows the conduction of a first switch component of the converter circuit of FIG. 2, as a function of rotor position, θ, under voltage PWM control.
FIG. 8(e) shows the conduction of a second switch component of the converter circuit of FIG. 2, as a function of rotor position, θ, under voltage PWM control.

In the discharging mode, as best shown in FIG. 5, both the switch components 6 and 7 are open, thereby allowing current to discharge from the second winding 13 back through the positive terminal 2. The current can then recharge the power source, which can be in the form of a battery. In the present embodiment, a capacitor 15 is connected between the positive 2 and negative 3 terminals and in parallel to the phase circuit 4. Thus, the discharging current recharges the capacitor 15.

It will be appreciated that the three modes described allow the phase circuit 4 to better control the build-up and release of energy. In particular, the freewheeling mode allows energy accumulated during the charging mode to decay more slowly than in the discharging mode. The discharging mode allows the recovery of the remaining energy by recharging the power supply or other energy store, like a capacitor. The phase circuit can be controlled using various control modes, including current hysteresis, single-pulse voltage, and voltage PWM. The performance characteristics of the phase circuit 4 under these three control modes are shown in the schematic waveforms of Figures 6(*a*)-6(*f*), 7(*a*)-7(*e*), and 8(*a*)-8(*e*).

In the present embodiment, each switch component 6 and 7 of the switch module 5 includes a transistor 16 and a switch component diode 17 connected in reverse bias in parallel across the transistor.

Advantageously, the switch module 5 is an integrated pre-manufactured unit, such as an IGBT module or a GTO module. This allows the use of readily available switch modules manufactured, for example, for the industrial products industry. These are often mass-produced, and therefore, relatively inexpensive.

The phase circuit 4' of FIG. 11 includes a plurality of the second windings 13, each connected in parallel to the other second windings and connected between the intermediate connection 10 and the terminal 2 or 3 to which the second connection 9 is connected. Each second winding 13 is inductively coupled to the first winding 11. The phase circuit 4 also includes a plurality of the first diodes 12, each corresponding to a respective one of the second windings 13. Each first diode 12 is connected in parallel to the other first diodes and connected in reverse bias between the intermediate connection 10 and the terminal 2 or 3 to which the first winding 11 is connected. Further, the phase circuit 4 4' also includes a plurality of the second diodes 14, each corresponding to a respective one of the second windings 13. Each second diode 14 is connected in reverse bias in series to the respective second winding 13 and connected between the intermediate connection 10 and the terminal 2 or 3 to which the second connection 9 is connected.

In the embodiment shown in FIG. 9, the converter circuit 1 includes a plurality of the phase circuits 4. Each phase circuit 4 can correspond to a respective phase of a multi-phase power supply. Each phase circuit can also correspond to a respective phase of a multi-phase motor, such as the motor 18 shown schematically in FIG. 10.

Another aspect of the present invention provides a multi-phase motor including a converter circuit according to the invention. An embodiment is the four-phase motor 18 shown in FIG. 10, which includes the converter circuit 1 described above with four of the phase circuits 4, each corresponding to a respective phase of the motor. In this embodiment, the motor 18 includes a stationary stator 19 having eight stator poles 20, that is, two poles per phase. The motor 18 further includes a rotatably mounted rotor 21 with six poles. The first and second windings 11 and 13 of each phase are wound around the two poles corresponding to the phase.

Each phase is operated sequentially, thereby energizing the respective windings 11 and 13 of each phase sequentially, to force the rotation of the rotor. In operating each phase, the three operational modes of charging, freewheeling, and discharging can be utilized under a control mode, such as current hysteresis, single-pulse voltage, and voltage PWM.

In a further aspect of the present invention, a method of controlling a multi-phase motor is provided. A preferred embodiment of this aspect of the invention includes the steps of providing the converter circuit 1 described above, and controlling the four-phase motor 18 with the converter circuit 1, which has four phase circuits 4, each corresponding to a respective phase of the four-phase motor 18. The step of controlling the multi-phase motor 18 includes the steps of operating each phase circuit 4 sequentially.

The operation of each phase circuit 4 includes closing both the switch components 6 and 7, thereby allowing current to flow from the power supply to charge the first winding 11, and thereby inductively charging the second winding 13. The operation of each phase circuit 4 also includes closing one of the switch components 7 and opening the other of the switch components 6, thereby allowing current to freewheel through the second winding 13, the closed switch component 7, and the second diode 14. Further, the operation of each phase circuit 4 includes opening both the switch components 6 and 7, thereby allowing current to discharge from the second winding 13 back through the positive terminal 2.

The step of controlling the multi-phase motor 18 further includes using one of the following control modes: current hysteresis control, single-pulse voltage control, and voltage PWM control. If other control modes are applicable, then these can be used as well.

The present invention provides many significant advantages over the prior art. The converter circuit provided can be operated in charging, freewheeling, and discharging modes while only requiring one switch module for each phase. The switch module can be one of the many readily available or mass-produced pre-manufactured integrated switch modules that are on the market, such as those produced for industrial products.

Thus, the present invention avoids the need for circuits having at least two discrete switch components or two discrete switch modules. This results in simpler circuitry, reduced materials cost, and reduced handling and manufacturing time, and therefore, cost. The present invention also provides converter circuits that have a smaller size and weigh less than prior circuits. Also, the converter circuits of the present invention do not have redundant components such as those using a switch module having two switch components in place of a discrete switch component.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. A converter circuit including:
a positive terminal connectable to a positive pole of a power supply, and a negative terminal connectable to a negative pole of the power supply; and
a phase circuit including:
a switch module having first and second switch components, a first side of the first switch component forming a first connection, a first side of the second switch component forming a second connection, and second sides of the first and second switch components being interconnected to form an intermediate connection;
a first winding connected between the first connection and one of the positive and negative terminals, the second connection being connected to the other of the positive and negative=terminals;
a first diode connected, in reverse bias, between the intermediate connection and the terminal to which the first winding is connected;
a second winding connected between the intermediate connection and the terminal to which the second connection is connected; and
a second diode connected, in reverse bias, in series to the second winding and connected between the intermediate connection and the terminal to which the second connection is connected, wherein the second winding is inductively coupled to the first winding.

2. The converter circuit according to claim 1 wherein the switch module is an integrated pre-manufactured unit.

3. The converter circuit according to claim 1 wherein each switch component includes a transistor.

4. The converter circuit according to claim 3 wherein each switch component includes a switch component diode connected, in reverse bias, in parallel across the transistor.

5. The converter circuit according to claim 1 wherein the switch module is an insulated gate bipolar transistor module or a gate turn off thyristor module.

6. The converter circuit according to claim 1 wherein the first and second windings form a bifilar winding.

7. The converter circuit according to claim 1 wherein the first winding is connected between the first connection and the positive terminal.

8. The converter circuit according to claim 1 wherein the phase circuit includes a plurality of the second windings, and each of the second windings is connected in parallel to the other second windings and connected between the intermediate connection and the terminal to which the second connection is connected, and each of the second windings is inductively coupled to the first winding.

9. The converter circuit according to claim 8 wherein the phase circuit includes a plurality of the second diodes, each of the second diodes corresponding to a respective one of the second windings, and each of the second diodes is connected, in reverse bias, in series to the respective second winding and is connected between the intermediate connection and the terminal to which the second connection is connected.

10. The converter circuit according to claim 8 wherein the phase circuit includes a plurality of the first diodes, each of the first diodes corresponding to a respective one of the second windings, and each of the first diodes is connected in parallel to the other first diodes and is connected in reverse bias between the intermediate connection and the terminal to which the first winding is connected.

11. The converter circuit according to claim 1 including a capacitor connected between the positive and negative terminals and in parallel with the phase circuit.

12. The converter circuit according to claim 1 wherein the phase circuit, when connected to the power supply, is operable in:
   a charging mode in which both of the first and second switch components are closed, thereby allowing current to flow from the power supply to charge the first winding, and thereby inductively charging the second winding;
   a freewheeling mode in which one of the first and second switch components is closed and the other of the first and second switch components is open, thereby allowing current to freewheel through the second winding, the one of the first and second switch component that is closed, and the second diode; and
   a discharging mode in which both of the first and second switch components are open, thereby allowing current to discharge from the second winding through the positive terminal.

13. The converter circuit according to claim 1 including a plurality of the phase circuits.

14. The converter circuit according to claim 13 wherein each phase circuit corresponds to a respective phase of a multi-phase power supply.

15. The converter circuit according to claim 13 wherein each phase circuit corresponds to a respective phase of a multi-phase motor.

16. A motor control circuit for a multi-phase motor that includes plurality of phases, the control circuit comprising:
   a positive terminal connectable to a positive pole of a power supply, and a negative terminal connectable to a negative pole of the power supply; and
   a plurality of phase circuits, each phase circuit corresponding to a respective phase of the multi-phase motor and including:
      a switch module having first and second switch components, a first side of the first switch component forming a first connection, a first side of the second switch component forming a second connection, and second sides of the first and second switch components being interconnected to form an intermediate connection;
      a first winding connected between the first connection and one of the positive and negative terminals, the second connection being connected to the other of the positive and negative=terminals;
      a first diode connected, in reverse bias, between the intermediate connection and the terminal to which the first winding is connected;
      a second winding connected between the intermediate connection and the terminal to which the second connection is connected; and
      a second diode connected, in reverse bias, in series to the second winding and connected between the intermediate connection and the terminal to which the second connection is connected, wherein the second winding is inductively coupled to the first winding.

* * * * *